(12) United States Patent
Maldonado

(10) Patent No.: US 9,151,173 B2
(45) Date of Patent: Oct. 6, 2015

(54) USE OF MULTI-FACETED IMPINGEMENT OPENINGS FOR INCREASING HEAT TRANSFER CHARACTERISTICS ON GAS TURBINE COMPONENTS

(75) Inventor: Jaime Javier Maldonado, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 634 days.

(21) Appl. No.: 13/326,372

(22) Filed: Dec. 15, 2011

(65) Prior Publication Data

US 2013/0156549 A1     Jun. 20, 2013

(51) Int. Cl.
  *F01D 9/04* (2006.01)
  *F01D 5/18* (2006.01)
  *F01D 9/06* (2006.01)

(52) U.S. Cl.
  CPC ............... *F01D 9/041* (2013.01); *F01D 5/189* (2013.01); *F01D 9/065* (2013.01); *F05D 2250/131* (2013.01); *F05D 2260/201* (2013.01); *Y02T 50/676* (2013.01)

(58) Field of Classification Search
  CPC .......... F01D 5/08; F01D 5/081; F01D 5/082; F01D 5/084; F01D 5/18; F01D 5/187; F01D 5/188; F01D 5/189; F01D 5/186; F01D 9/041; F01D 9/065; F05B 2260/20; F05B 2260/201; F05B 2260/202; F05B 2260/222; F05B 2260/224; F05D 2250/131; F05D 2260/201
  USPC .... 415/115, 116; 416/97 R, 97 A, 96 R, 96 A
  See application file for complete search history.

(56) References Cited

U.S. PATENT DOCUMENTS

| | | | |
|---|---|---|---|
| 1,545,560 | A | 7/1925 | Heath |
| 1,939,357 | A | 12/1933 | Lorenzen |
| 3,148,954 | A | 9/1964 | Haas |
| 4,168,938 | A | 9/1979 | Dodd |
| 4,461,612 | A | 7/1984 | Dodd |

(Continued)

FOREIGN PATENT DOCUMENTS

| | | |
|---|---|---|
| CN | 1477292 A | 4/2005 |
| CN | 101650033 A | 2/2010 |
| EP | 1 605 138 A2 | 12/2005 |

OTHER PUBLICATIONS

Office Action dated Apr. 3, 2015 issued in corresponding Chinese Application No. 201210545238.3 (6 pages).

(Continued)

*Primary Examiner* — Dwayne J White
*Assistant Examiner* — William Grigos
(74) *Attorney, Agent, or Firm* — Nixon & Vanderhye P.C.

(57) ABSTRACT

An improved nozzle vane for a gas turbine engine, comprising a vane wall having inner and outer wall surfaces, the wall surfaces being spaced from one another to define a plurality of fluid passageways for a cooling medium; discreet cavities formed by interior wall members disposed between the inner and outer wall surfaces and within the fluid passageway for the cooling medium; a plurality of impingement cooling sleeves disposed in the discreet cavities defined by the inner and outer wall surfaces and by interior wall members; and a plurality of non-round, e.g., serrated, openings in each of the impingement cooling sleeves, with the openings being sufficient in size and number to accommodate the flow of a cooling media.

18 Claims, 3 Drawing Sheets

(56) References Cited

U.S. PATENT DOCUMENTS

| | | | |
|---|---|---|---|
| 4,645,415 A | 2/1987 | Hovan et al. | |
| 4,669,957 A | 6/1987 | Phillips et al. | |
| 4,712,980 A | 12/1987 | Gely et al. | |
| 4,795,313 A | 1/1989 | Coulon | |
| 5,210,946 A | 5/1993 | Monroe | |
| 5,624,231 A | 4/1997 | Ohtomo et al. | |
| 5,634,766 A * | 6/1997 | Cunha et al. | 415/115 |
| 5,667,359 A | 9/1997 | Huber et al. | |
| 5,685,693 A | 11/1997 | Sexton et al. | |
| 5,743,708 A | 4/1998 | Cunha et al. | |
| 5,779,437 A | 7/1998 | Abdel-Messeh et al. | |
| 5,785,498 A | 7/1998 | Quinn et al. | |
| 6,183,192 B1 | 2/2001 | Tressler et al. | |
| 6,238,182 B1 | 5/2001 | Mayer | |
| 6,289,981 B1 * | 9/2001 | Tokizaki et al. | 165/177 |
| 6,468,031 B1 * | 10/2002 | Yu et al. | 415/115 |
| 6,616,405 B2 | 9/2003 | Torii et al. | |
| 6,676,875 B1 | 1/2004 | Takeuchi | |
| 7,008,178 B2 * | 3/2006 | Busch et al. | 415/115 |
| 7,052,233 B2 * | 5/2006 | Fried et al. | 415/121.2 |
| 7,300,251 B2 | 11/2007 | Kitamura et al. | |
| 2002/0090294 A1 * | 7/2002 | Keith et al. | 415/115 |
| 2005/0084371 A1 | 4/2005 | Fried et al. | |
| 2008/0031738 A1 * | 2/2008 | Lee | 416/97 R |
| 2010/0129196 A1 * | 5/2010 | Johnston et al. | 415/115 |
| 2010/0143154 A1 * | 6/2010 | Abba et al. | 416/97 R |
| 2010/0313419 A1 * | 12/2010 | Stampfli et al. | 29/889.1 |
| 2011/0027102 A1 * | 2/2011 | Nakamata et al. | 416/97 R |
| 2011/0097191 A1 * | 4/2011 | Bunker | 415/115 |
| 2011/0123312 A1 * | 5/2011 | Venkataramanan et al. | 415/115 |
| 2013/0051980 A1 * | 2/2013 | Grohens et al. | 415/115 |

OTHER PUBLICATIONS

Extended Search Report dated Jun. 22, 2015 issued in corresponding European Application No. 12196112.2 (7 pages).

* cited by examiner

USE OF MULTI-FACETED IMPINGEMENT OPENINGS FOR INCREASING HEAT TRANSFER CHARACTERISTICS ON GAS TURBINE COMPONENTS

The present invention relates to gas turbine engines such as those used for electrical power generation and aircraft engines and, more particularly, to a system for cooling nozzles and associated vanes using a nozzle cavity and vane design with improved convection and impingement cooling capabilities. The invention can also be used for other engine components, such as shrouds, buckets, combustors, as well as with different airfoils and the inner and outer nozzle sidewalls.

BACKGROUND OF THE INVENTION

Over the years, various cooling mechanisms have been employed to protect hot gas path components of gas turbine engines during extended operation, particularly stage one nozzles which often encounter the highest temperature exhaust gases. Most closed circuit cooling systems include a plurality of nozzle vane segments extending between inner and outer side walls of the nozzle. Typically, the vanes include cavities in fluid communication with compartments in the outer and inner side walls to accommodate the flow of cooling media within a closed circuit for cooling the outer and inner walls. The cooling media feeds into a plenum in the outer wall for distribution to the different chambers and flow passages defined by impingement openings allowing for the flow of coolant onto the outer wall surface of the vane. The spent impingement cooling media then flows into the leading edge and aft cavities extending radially through the vane.

In the past, steam has been used as a cooling medium for certain types of nozzle vanes. Even though steam has a higher heat capacity than air at nominal operating temperatures, steam cooling designs for turbine vanes and other engine components exhibit certain thermodynamic inefficiencies. For example, the steam must be maintained inside a closed circuit in order to avoid mixing with the hot gas stream. As a result, some components in the hot gas path cannot be cooled as efficiently with steam inside a closed circuit because, for example, the relatively thin structure of the trailing edges of the nozzle vanes precludes effective steam cooling of certain portions of the vanes.

Another known approach for cooling gas turbine engine blades and nozzles involves the use of a partial feed of high pressure cooling air, normally provided by an internal source such as an intermediate or final stage of a gas turbine compressor. Typically, a series of internal flow passages in and around the nozzle provide the desired supplemental cooling of the vanes using air film cooling and external piping supplies the compressed air to the nozzles which is eventually discharged into the hot gas stream of the gas turbine.

Most current gas turbines also rely on some form of impingement heat transfer to cool the nozzle vanes by placing a bank of round holes against the vane surface and introducing a relatively high velocity jet of fluid (steam or air) directly against the solid surface. The higher the velocity of the cooling fluid, the longer the molecules tend to remain in contact with the surface and exchange heat. For that reason, impingement cooling fluid jets normally introduce air perpendicular to the metal surface to maximize the incident velocity against the surface. In some recent designs, impingement air cooling has been used in combination with steam to lower the operating temperature of specific portions of the nozzle vanes that would not otherwise be effectively cooled by steam alone. However, virtually all impingement cooling systems for gas turbines using air alone rely on a prescribed number and arrangement of round holes in the vanes to accommodate the fluid flow.

Although relatively high levels of heat transfer can be achieved in a first stage nozzle using impingement cooling with round openings, once the impingement contact occurs, the fluid molecules tend to move parallel to the solid vane surface and the fluid velocity becomes significantly reduced with fewer molecules contacting the solid surface, ultimately resulting in reduced heat transfer. The cooling fluid velocity also becomes much lower due to fluid entering from neighboring round impingement holes which can collide, mix and eventually reduce the coolant throughput. Similarly, localized pressure sinks tend to redirect fluid flow, reducing the fluid velocity even further. This heat transfer degradation in nozzle vanes (called "cross flow effect") decreases the level of heat transfer due to the phenomena invariably associated with round impingement openings.

Thus, it has been found that the use of compressed air and/or steam using round impingement holes for cooling purposes comes at a price of somewhat reduced thermodynamic efficiency due to the resulting air flow characteristics. The amount of heat transfer between coolant and the vane surface is directly proportional to the coolant velocity as it impinges and then turns parallel to the surface being cooled. Thus, a discrete set of varying heat transfer coefficients exist over the hot surface to be cooled. The highest heat transfer is achieved directly opposite the impinging hole but becomes lower as the coolant velocity decreases away from the hole. The cooling effect is also reduced by the cross flow interactions from adjacent round holes because the coolant from neighboring holes mixes with coolant from the round impingement hole, lowering its velocity and reducing the heat transfer potential.

A significant need therefore still exists to identify methods of maximizing the heat transfer potential of compressed air or steam used for vane cooling and thereby maintain component temperatures within strict operational requirements. A need also exists to increase the coolant velocity while making the flow more uniform over the largest area of the vane surface being cooled, thereby providing superior overall heat transfer efficiency.

As noted above, the current state of the art addressing impingement cooling issues relies almost exclusively on round impingement holes to produce a desired cooling effect. See, e.g., U.S. Pat. No. 6,468,031 (describing a nozzle using round impingement holes to increase the heat transfer on the internal face of the airfoil). Similarly, EP1247940A1 describes the use of round impingement holes having variable diameters to prevent clogging without reducing heat transfer between the coolant and nozzle surfaces.

BRIEF DESCRIPTION OF THE INVENTION

The present invention provides an improved nozzle vane for a gas turbine using distinctly different impingement openings and resulting air flow. As noted above, the invention can also be used in connection with other gas turbine engine components that may benefit from impingement cooling, including shrouds, buckets, and combustors, as well as other types of airfoils and even the inner and outer nozzle sidewalls.

In an exemplary embodiment relating to a nozzle vane, the invention comprises (1) a vane wall having inner and outer surfaces, with the wall surfaces spaced from one another to define a fluid passageway for a cooling medium (typically compressed ambient air); (2) a plurality of discreet cavities formed by interior wall members in the vane disposed between the inner and outer wall surfaces and within the fluid passageway for the cooling medium; (3) a plurality of impingement cooling sleeves disposed in the discreet cavities defined by the inner and outer wall surfaces and the interior wall members; and (4) a plurality of non-round openings in each of the impingement cooling sleeves, with the openings being sufficient in size and number to accommodate the flow of a high pressure cooling media.

In the embodiments described herein, each of a plurality of impingement openings are formed as small circumferential fluid passages having a radial array of projections emanating from the center of each opening. Taken together, the projections form, by way of example, a radial array of substantially uniform fluid pathways, e.g., star-like in form, that emanate from the center of the opening. The projections may take various forms, including projections that are equidistant or, alternatively, of different sizes and varying distances of separation one from another.

As discussed below, the non-round openings in the impingement cooling sleeves described herein provide much more efficient mixing and heat transfer potential as compared to round openings. That is, it has now been found that the non-round impingement openings increase the cooling fluid velocity and minimize cross flow effects, thereby increasing heat transfer between the cooling fluid and vane surface. The new geometric patterns also generate a vortex field in and around the impingement openings which provide for more efficient mixing and improved air velocity distribution at each opening. This characteristic of the discreet fluid pathways emanating from the center of each opening (e.g., openings having a star-like configuration) significantly improve the heat transfer capabilities of existing nozzle designs due to improved mixing and higher velocity characteristics of the openings.

In addition, the use of the new impingement openings are economically viable since they can be formed without requiring any significant design or operational changes to other parts of the gas turbine engine. The invention thus enhances the impingement heat transfer potential for various types of nozzles, vanes, shrouds, buckets, combustors and airfoils with only minimal additional manufacturing cost and complexity. The increase in heat transfer also improves the anticipated life of key engine components, particularly those exposed to the high gas path temperatures in the gas turbine. In particular, the use of a plurality of circumferential fluid passages with a radial array of projections emanating from the center ultimately translates to lower metal temperatures and a longer life for key hot gas path components. Depending on the specific application, this heat transfer enhancement reduces engine coolant requirements and eventually improves overall performance and thermodynamic efficiency of the engine.

The use of multi-faceted impingement openings according to the invention can be implemented in various components such as nozzles, buckets, shrouds, combustors, and casings. The specific geometric dimensions of the star-like openings may also vary slightly, depending on the particular end use application, target component and cooling flow requirements. The invention thus contemplates using various shapes of non-round impingement openings, including for example "chevron" type holes or other symmetric configurations. When applied to early stage nozzles, first stage buckets, combustor liners and/or casing temperature control devices, the design can improve the heat transfer capability of those components.

These, as well as other objects and advantages of this invention, will be more completely understood and appreciated by the following more detailed description of the presently preferred exemplary embodiments taken in conjunction with the accompanying drawings.

DETAILED DESCRIPTION OF THE INVENTION

As noted above, the impingement openings according to the invention improve heat transfer and increase the effective use of cooling air and/or steam to reduce nozzle and other engine component temperatures. The multiple geometric edges that define an opening have a size and configuration that result in a higher impingement jet velocity and increased heat transfer as compared to round openings with a comparable cross sectional area. The use of such multi-faceted impingement holes allows for greater throughput and a net reduction in metal temperatures. It has also been found that the star-like configuration has the capability to develop a vortex flow field that provides for a more efficient mixing of the cooling air before it impacts the vane. The more efficient mixing allows for a higher velocity distribution of the cooling air, and hence higher heat transfer between the fluid and the surface.

Figure 1:
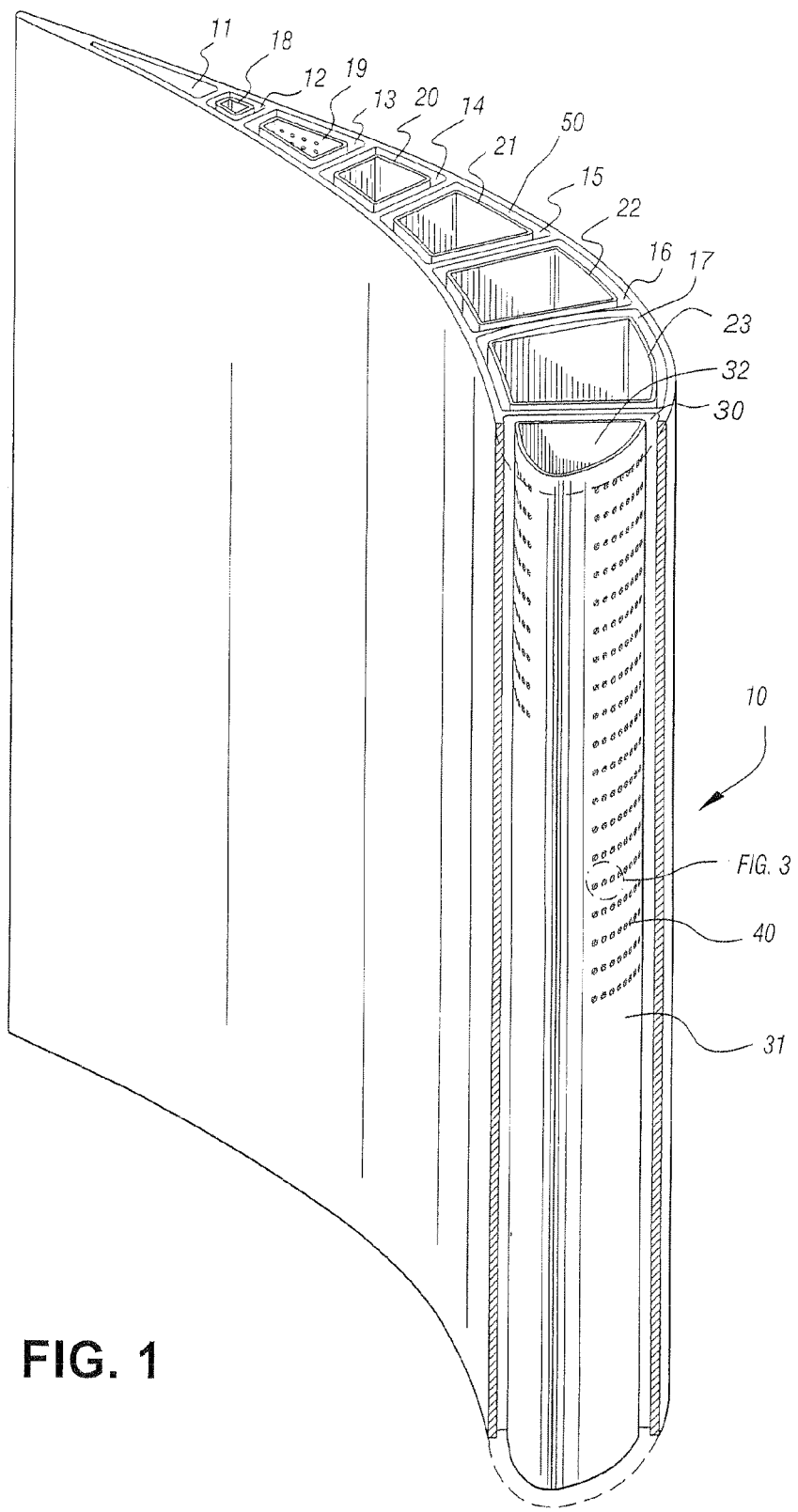
FIG. 1 is a schematic, broken perspective view of a nozzle vane having a cooling insert sleeve disposed in a vane cavity with impingement openings embodying the present invention.
Figures 2, 3:
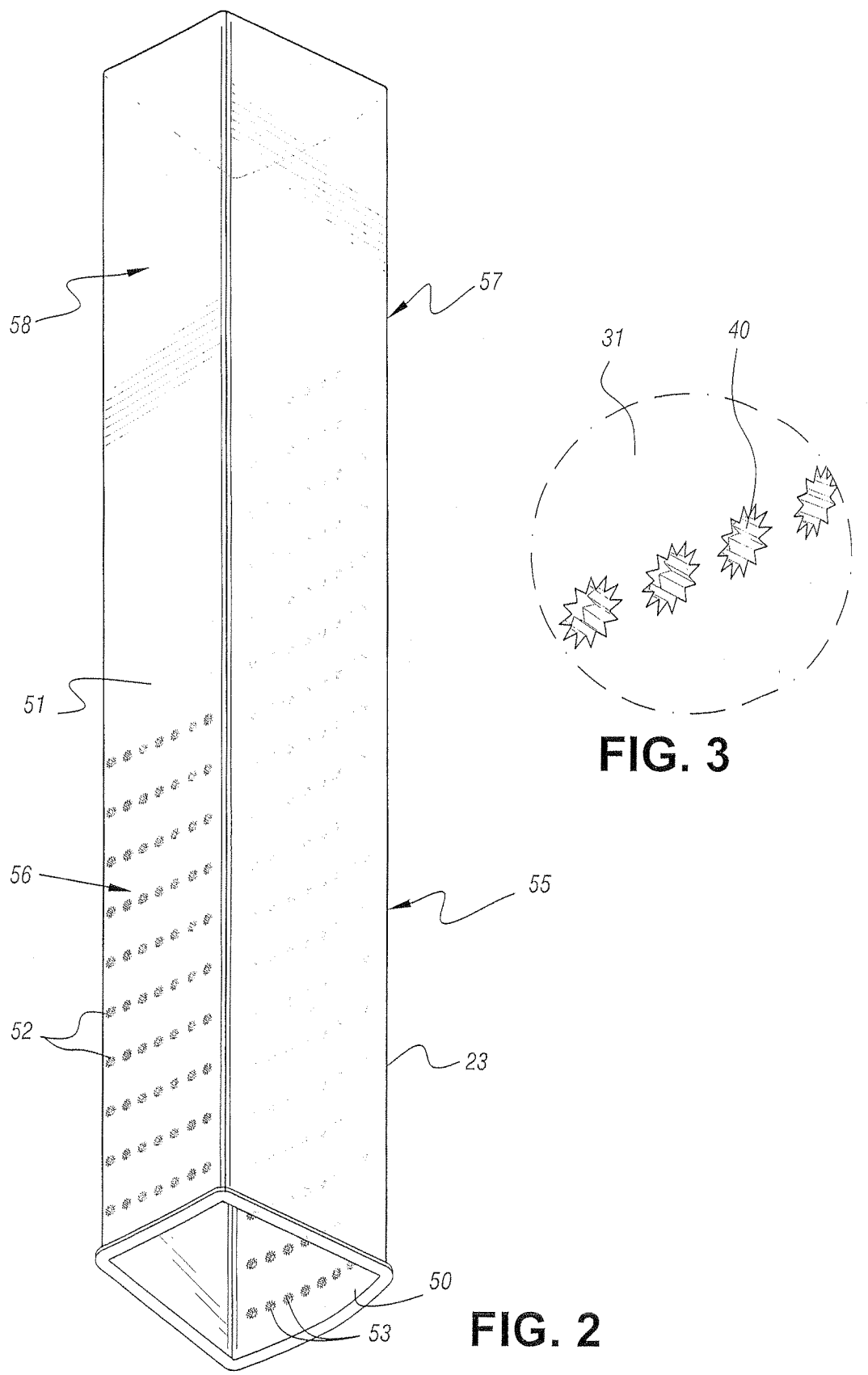
FIG. 2 is a further perspective view of an exemplary insert sleeve having the new impingement openings.
FIG. 3 is an enlarged view of certain selected impingement openings depicted in the embodiment of FIG. 1.

The general form of an exemplary insert sleeve is illustrated in FIGS. 1-3. FIG. 1 shows a sleeve for the leading edge cavity, whereas FIGS. 2 and 3 illustrate an exemplary sleeve specifically for cavity 17 in FIG. 1. In the embodiment of FIG. 1, nozzle vane 10 includes a plurality of integral cavities 11, 12, 13, 14, 15, 16 and 17, each of which has an insert sleeve, with insert sleeves 18, 19, 20, 21, 22 and 23 being in the general form of hollow generally rectangular sleeves having the multi-faceted fluid passages described below. The sleeves are shaped to closely correspond to the shape of the particular cavity in which the sleeve is housed with two sides of the sleeves having a plurality of impingement cooling openings along portions of the sleeve adjacent to the walls of the cavity.

In the leading edge cavity 30 of FIG. 1, the forward edge of insert sleeve 31 has a curved configuration with the side walls generally corresponding in shape to the side walls of multi-faceted cavity 30. The side walls of the insert sleeve include a plurality of impingement openings along a portion of the entire length. As shown, the impingement openings have a multi-faceted, i.e., serrated, configuration (also shown as enlarge impingement opening 40). The back side 32 of insert sleeve 31 does not include any impingement openings. Similarly, in the aft cavities 13, 12 and 11, the side walls of the insert sleeves 19 and 18 have impingement openings only along a portion of the length, whereas the forward and aft walls of insert sleeves 19 and 18 are formed from a solid non-perforated material. The multi-faceted configuration depicted in FIG. 1 is only one example of the type of opening contemplated by the invention. Other geometric configurations with uniform and non-uniform serrations could be used, such as multi-pointed stars, chevron type holes, "spiked" openings and the like.

The sleeves in cavities 30, 17, 16, 15, 14, 13 and 12 are spaced from the walls of the cavities to enable the cooling media, e.g., compressed air, flowing into and through the impingement openings to impact against the interior wall surfaces of the cavities, thereby cooling the wall surfaces in the manner described above. As the impingement coolant progresses down from the upstream end of the cavity, cross-flow degradation tends to increase and normally would cause lower heat transfer. However, the new impingement cooling openings exhibit a lower pressure drop over the length of the vane while providing more efficient cooling.

As FIG. 1 also illustrates, the insert sleeves include impingement cooling openings disposed on an upstream part of the sleeve. The other, downstream part is substantially imperforate and does not contain holes but instead acts as a blocking mechanism by reducing the coolant flow area in the area between the insert sleeve and the cavity interior wall. See sleeve gap 50. The design using the new impingement openings thus allows for improved mixing, increased impingement air jet velocities as the air moves from the opening to the target surface, and ultimately better heat transfer coefficients along the entire length of the vane. The new openings also reduce unintended post impingement coolant cross-flow.

Insert sleeve 23 illustrated in FIGS. 1 and 2 comprises an elongated sleeve having an open lower end with a marginal flange for connecting to the opening of a corresponding cavity, e.g., cavity 17 in FIG. 1. The side walls 50, 51 of sleeve 23 include a plurality of serrated impingement cooling openings 52, 53, respectively, as shown in detail at 40 in enlarged FIG. 3. Impingement cooling holes 52, 53 are defined along first upstream sleeve portions 55 and 56 of the sleeve for flowing cooling medium into the spaces between the sleeve and the interior vane wall surfaces to be cooled. The serrations on the openings also generate a vortex field that results in improved mixing within the impingement outside interface and thus higher impingement jet velocities impacting the cavity wall which, in turn, produces higher heat transfer coefficients, lower metal surface temperatures and more effective use of available cooling air. Downstream sleeve portions 57, 58 of the sleeve do not have impingement holes. Instead, the downstream portions reduce the coolant flow area in the cavity 17 by defining fluid flow channels that benefit from post impingement cooling flow via the spaces defined adjacent the first impingement openings in the sleeve.

As illustrated in FIG. 2, the extent of the portions of the sleeve on which the impingement holes 52 and 53 have been provided depends upon whether the insert sleeve side wall faces the pressure side or suction side of the airfoil. While the extent of the impingement holes on each side can be varied as deemed necessary or desirable, the extent of the impingement is preferably greater on the pressure side of the sleeve than on the suction side.

Figure 4:
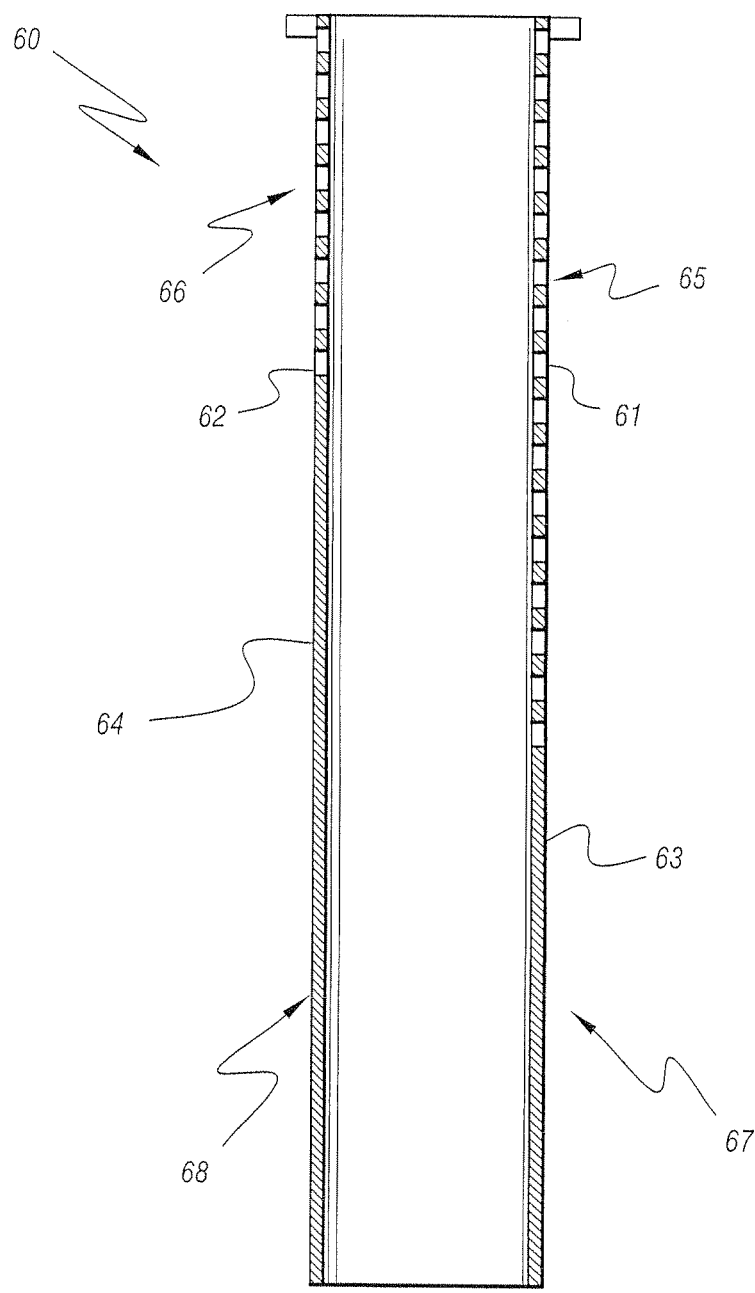
FIG. 4 is a schematic vertical cross-section of another insert sleeve embodying the invention.

Referring to FIG. 4, insert sleeve 60 is provided in vane cavity 19. The peripheral outline of insert sleeve 60 again follows the contour of the cavity and has star-shaped impingement openings 61, 62 on the side walls 63, 64. The coolant, e.g., compressed air, flows into the insert sleeve 60 from a plenum and then outwardly through openings 61, 62 for impingement cooling of the outer walls of the vane on opposite sides of cavity 19.

The extent of the insert sleeve 60 with impingement holes 61, 62 depends upon whether the insert sleeve side wall faces the pressure side or suction side of the airfoil. While the extent of the impingement holes on each side can be varied as deemed necessary or desirable to achieve the objectives of the invention, the extent of the holes generally is greater on the pressure side of the insert sleeve than on the suction side.

In FIG. 4, the impingement cooling serrated openings are again located in upstream sleeve portions 65, 66 of the insert sleeve whereas the other, downstream sleeve portions 67, 68 of the insert sleeve do not have holes. Instead, the downstream portions reduce the coolant flow area in the cavity 19. As with the insert sleeve in the leading edge cavity and the return cavities, the upstream portion using the new impingement openings allows for improved mixing, increased impingement air jet velocities and ultimately better heat transfer for those portions of the vane.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A nozzle vane for a gas turbine engine, comprising:
   a vane wall having inner and outer wall surfaces, said wall surfaces being uniformly spaced from one another to define a fluid passageway for a cooling medium;
   a plurality of cavities formed by interior wall members disposed between said inner and outer wall surfaces and within said fluid passageway;
   a plurality of impingement cooling sleeves disposed in said discreet cavities defined by said inner and outer wall surfaces and said interior wall members; and
   a plurality of non-round impingement openings in each of said impingement cooling sleeves, said openings being sufficient in size and number to accommodate the flow of said cooling medium into the interior of said fluid passageway, and said openings having a radial array of projections emanating from the center of each opening, said projections include straight edges that form jagged pointed projections at acute angles;
   wherein rims of said non-round impingement openings through which cooling flow enters are on the same geometric plane with said surface of said impingement cooling sleeves.

2. A nozzle vane according to claim 1, wherein said non-round openings in said impingement cooling sleeves comprise generally star-like fluid passages.

3. A nozzle vane according to claim 1, wherein said non-round openings in said impingement cooling sleeves define an array of generally uniform, equidistant fluid pathways emanating from the center of each opening.

4. A nozzle vane according to claim 1, wherein said non-round openings in said impingement cooling sleeves are disposed substantially along the length of each insert sleeve.

5. A nozzle vane according to claim 1, wherein said flow of said cooling medium impinges on said interior wall surfaces of said nozzle.

6. A nozzle vane according to claim 1, wherein said non-round openings in said impingement cooling sleeves are formed in first and second walls of each one of a plurality of impingement cooling sleeves.

7. A nozzle vane according to claim 1, wherein said discreet cavities formed by said impingement cooling sleeves have the same general configuration as said interior wall members.

8. A nozzle vane according to claim 1, wherein said discreet cavities and said impingement sleeves define a specific fluid flow gap for said cooling medium.

9. A nozzle vane according to claim 1, wherein said discreet cavities extend lengthwise and parallel to one another in said nozzle vane.

10. A nozzle vane according to claim 1, wherein said cooling medium includes compressed air.

11. A nozzle vane according to claim 1, wherein said cooling medium includes steam.

12. A nozzle vane according to claim 1, wherein said cooling medium is a mixture of steam and compressed air.

13. A nozzle vane according to claim 1, wherein the forward edge of said insert sleeve is curved in shape and the side walls of said sleeve generally correspond in shape to the side walls of said cavities.

14. A nozzle vane according to claim 1, wherein said impingement openings in said cooling sleeves result in improved air mixing along said nozzle vane.

15. A nozzle vane according to claim 1, wherein said impingement openings in said cooling sleeves result in increased impingement air jet velocities along said nozzle vane.

16. A nozzle vane according to claim 1, wherein said impingement openings reduce cross flow heat transfer degradation along said nozzle vane.

17. A nozzle vane according to claim 1, wherein said impingement openings are only disposed on an upstream part of said impingement cooling sleeve.

18. A nozzle vane according to claim 1, wherein said impingement openings are in a non-uniform serrated configuration.

\* \* \* \* \*